DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 21, 1972

896 O.G. 833

T896,040

PROCESS OF POLYMERIZING BUTADIENE IN THE PRESENCE OF LITHIUM CATALYST

Marlyn J. Brock, Akron, Ohio, assignor to The Firestone Tire and Rubber Company, Akron, Ohio

Continuation of applications Ser. No. 4,444, Jan. 19, 1970, and Ser. No. 58,386, Oct. 3, 1966, which is a continuation-in-part of application Ser. No. 427,415, Jan. 22, 1965. This application Jan. 14, 1971, Ser. No. 106,556

Int. Cl. C08d *3/06, 3/08*

U.S. Cl. 260—94.2

1 Sheet Drawing. 8 Pages Specification

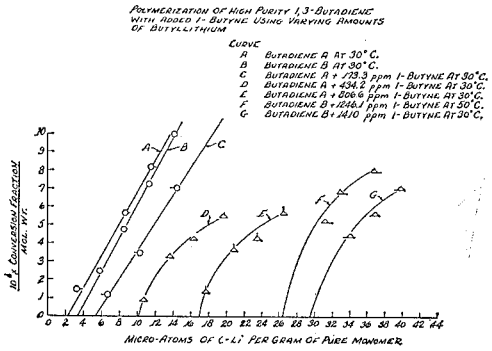

1,3-butadiene is polymerized in the presence of a hydrocarbon lithium catalyst in the presence of 400 to 1500 parts, more or less, of an alpha-acetylene or a lithium acetylide containing 2 to 8 carbon atoms (calculated as ethyl acetylene) per million parts of monomer as a modifier. The amount of catalyst present is in substantial excess over the stoichiometric amount required to react with the alpha-acetylene to produce lithium acetylide. Such excess is sufficient to initiate polymerization and produce polymer of the desired molecular weight.

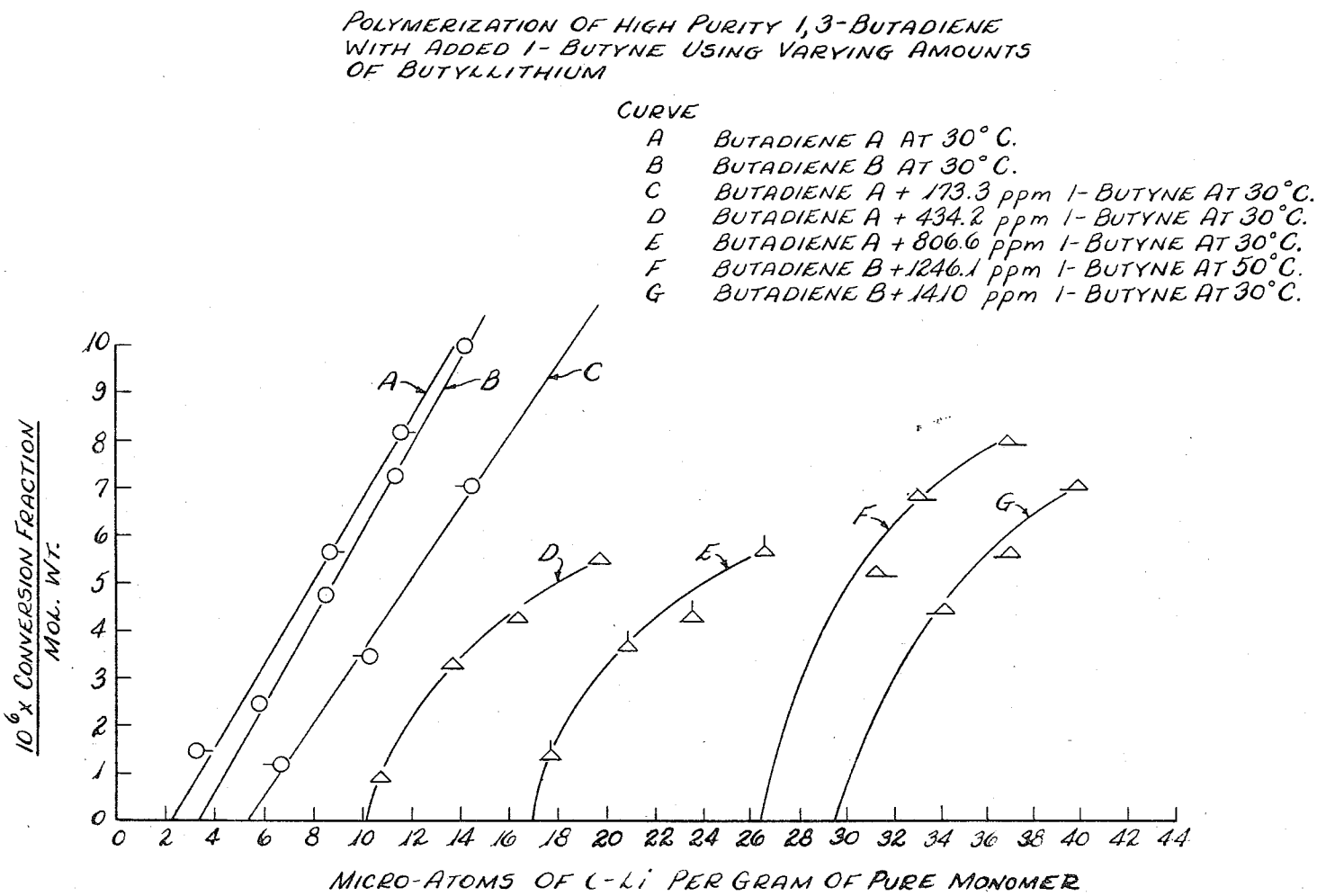

March 21, 1972 M. J. BROCK T896,040
PROCESS OF POLYMERIZING BUTADIENE IN THE PRESENCE OF LITHIUM CATALYST
Filed Jan. 14, 1971